US006428194B1

(12) United States Patent

Oschmann et al.

(10) Patent No.: US 6,428,194 B1

(45) Date of Patent: *Aug. 6, 2002

(54) HEADLIGHT FOR VEHICLE IN ACCORDANCE WITH PROJECTION PRINCIPLE

(75) Inventors: Horst Oschmann, Struth-Helmershof; Hartmut Stephan, Moorgrung-Etterwinden, both of (DE)

(73) Assignee: Robert Bosch GmbH, Stuttgart (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/372,378

(22) Filed: Aug. 11, 1999

(30) Foreign Application Priority Data

Aug. 28, 1998 (DE) ........................................ 198 39 194

(51) Int. Cl.[7] ................................................. B60Q 1/00

(52) U.S. Cl. ....................... 362/507; 362/509; 362/512; 362/514; 362/528; 362/539; 362/310; 362/248; 362/282

(58) Field of Search ................................ 362/512, 514, 362/515, 528, 421, 282, 248, 538, 539, 509, 351, 520, 336, 310; 264/264, 27.1

(56) References Cited

U.S. PATENT DOCUMENTS 5,718,505 A * 2/1998 Daumueller et al. ........ 362/507

FOREIGN PATENT DOCUMENTS

DE 41 09 657 A1 1/1992

* cited by examiner

*Primary Examiner*—Sandra O'Shea
*Assistant Examiner*—Bertrand Zeade
(74) *Attorney, Agent, or Firm*—Michael J. Striker

(57) ABSTRACT

A headlight for a vehicle operating in accordance with a projection principle has a light source, a reflector, a shield arranged in a beam path of a light reflected by the reflector for producing a bright-dark limit of a light bundle exiting the headlight, a lens through which the light passing on the shield passes, a light-permeable cover member arranged after the lens in a light outlet direction, the cover member having a region which deviates the passing light upwardly, and a screening device arranged between the shield and the cover member and formed so that at least a part of the light passing on the screen which would pass through the region of the cover member is screened.

7 Claims, 3 Drawing Sheets

HEADLIGHT FOR VEHICLE IN ACCORDANCE WITH PROJECTION PRINCIPLE

BACKGROUND OF THE INVENTION

The present invention relates to a headlight for vehicle operating in accordance with a projection principle.

Such a headlight is disclosed for example in the German patent document DE 41 09 657 A1. The headlight has a light source, a reflector, a shield arranged in a beam path of the light reflected by the reflector for producing a bright-dark limit of the light bundle exiting the headlight, a lense through which a light passing over the shield passes, and a light-permeable cover member arranged after the lens as considered in a light outlet direction. The cover member or cover disk is operative for covering the light outlet opening of the headlight only and has no or only a low optical function. In other words, the light must pass through the cover disk as uninfluenced as possible. The cover disk in its shape and in its outer appearance corresponds to the surrounding part of the vehicle, for example the chassis, the bumper or other parts. It is possible that the cover disk has a partial region which has an undesired optical action, in that the passing light can be deviated by it, for example upwardly, whereby a blinding of a counter coming vehicle driver can be caused.

SUMMARY OF THE INVENTION

Accordingly, it is an object of the present invention to provide a headlight for a vehicle operating in accordance with the projection principle, which avoids the disadvantages of the prior art.

In keeping with these objects and with others which will become apparent hereinafter, one feature of present invention resides, briefly stated, in a headlight for vehicle, in which the cover member has a region in which the light passing through it is deviated upwardly, and a screening device is provided between the shield and the cover disk with which at least a part of the light passing on the shield is screened, which would pass through the region of the cover disk.

When the headlight is designed in accordance with the present invention, it has the advantage that in a simple manner without special design of the cover disk, the upwardly directed light exit from the headlight is avoided.

In accordance with a further feature of the present invention, an additional shield is arranged between the first mentioned screen and the lens. This has the advantage that the additional lens is not directly visible when one looks on the headlight.

In accordance with a further feature of the present invention, the additional shield is formed of one piece with the carrier element. In this construction no additional mounting or connecting works are needed for the additional screen.

In accordance with still a further feature of present invention, the screening device is formed by a partial coating of the lens with at least partially light-impermeable material. In this construction no additional mounting or connecting works are needed for the screening device.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
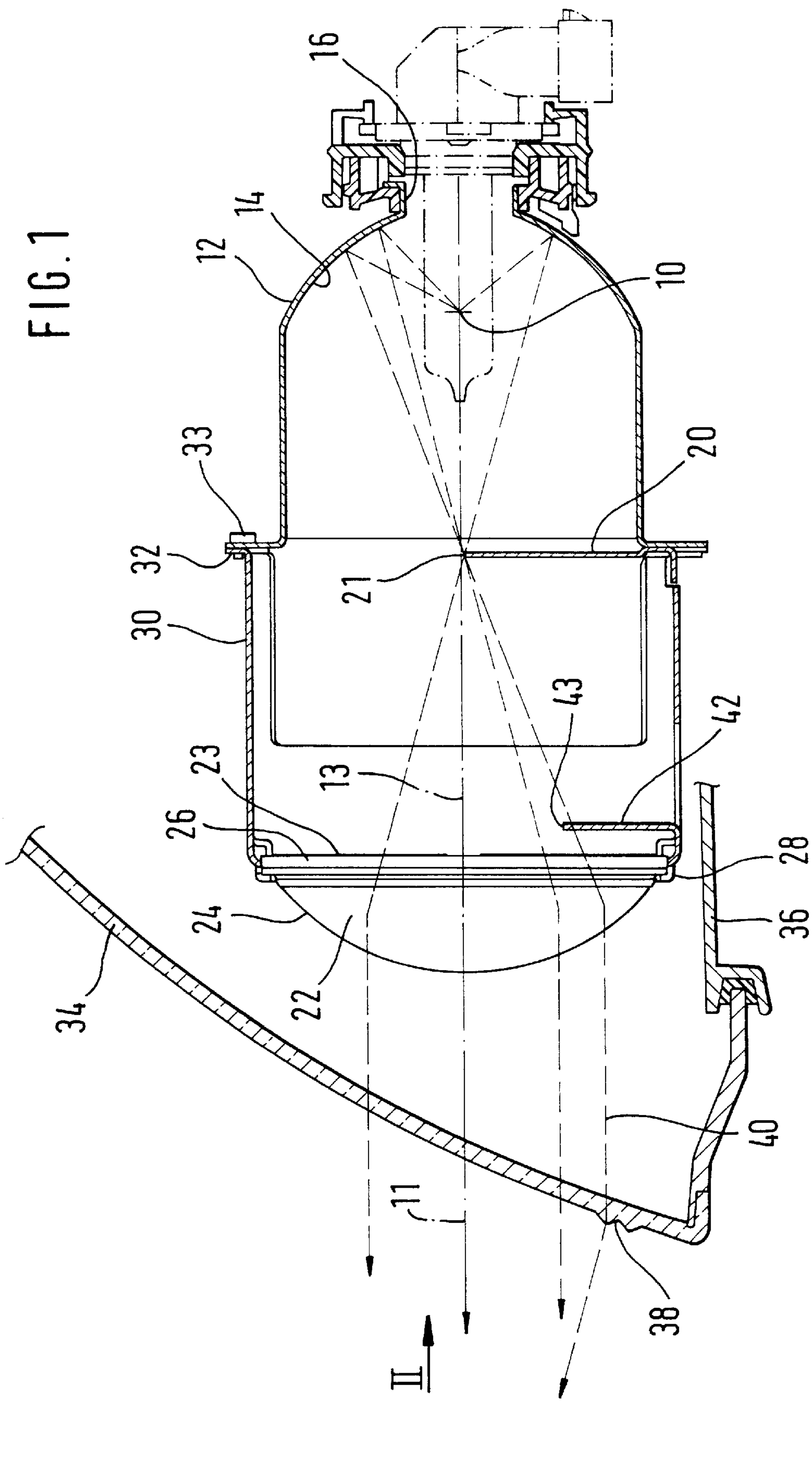
FIG. 1 is a view showing a headlight in accordance with a first embodiment of the present invention, in a vertical longitudinal section.
Figure 2:
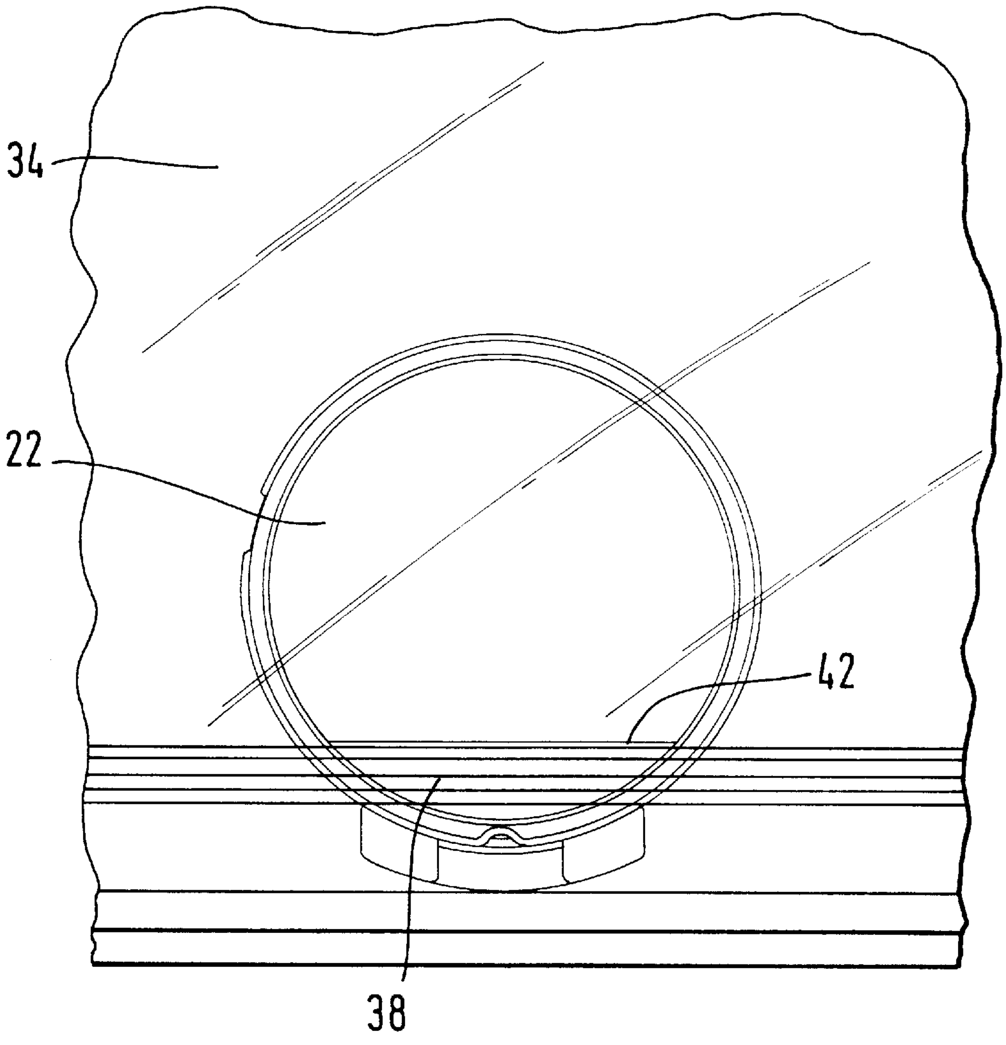
FIG. 2 is a view showing a headlight in a front view as seen in direction of the arrow 2 in FIG. 1.
Figure 3:
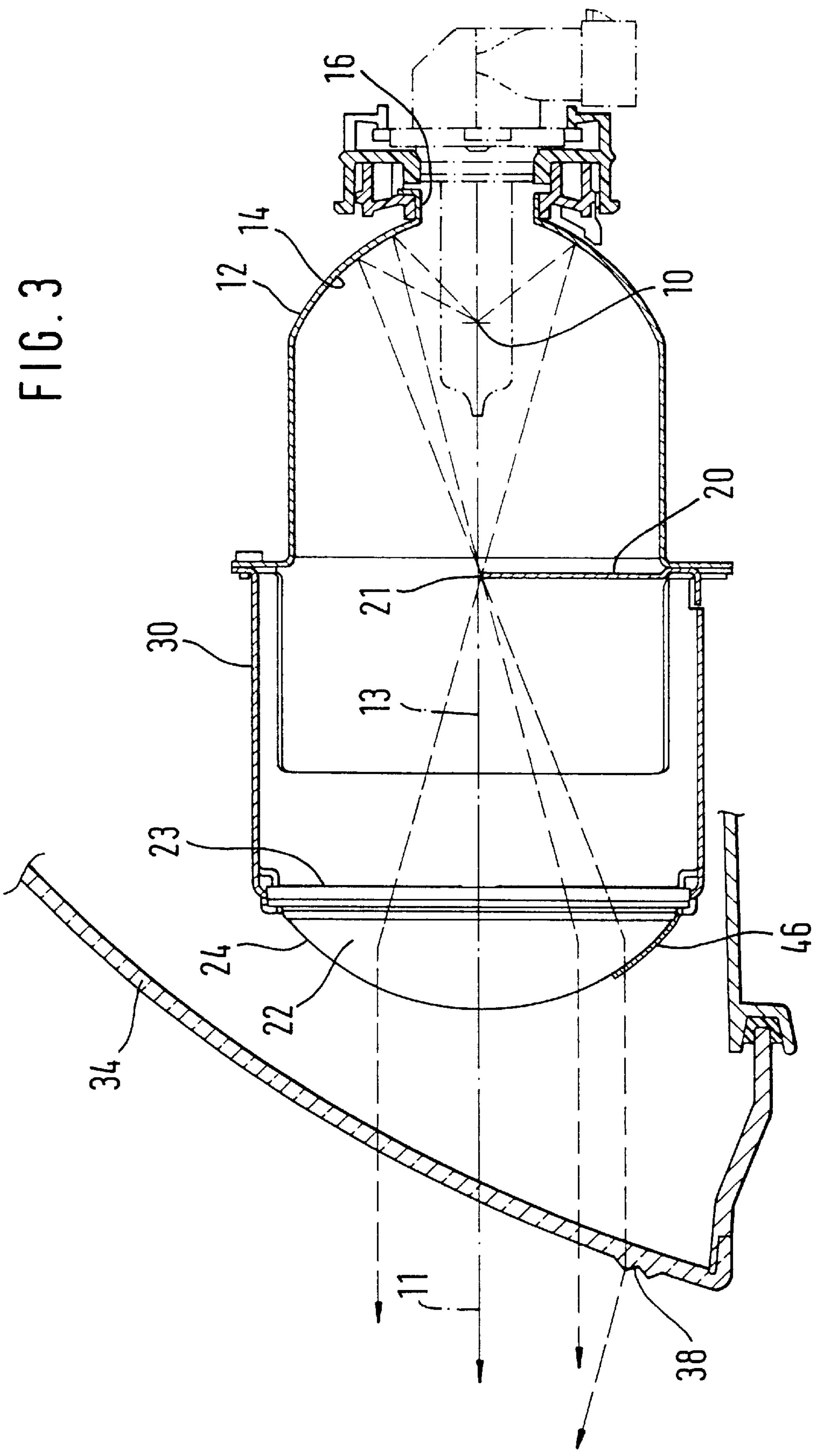
FIG. 3 is a view showing a headlight in accordance with a second embodiment of the present invention in a vertical longitudinal section.

A headlight for a vehicle, in particular a motor vehicle, which operates in accordance with the projection principle is shown in FIGS. 1–3. The headlight serves for producing a low beam. It can be assembled with a headlight for producing a high beam as well as in some cases a fog headlight and/or a blinking light to form a headlight unit. The headlight has a light source 10 which can be formed as an incandescent lamp or a gas discharge lamp. The headlight also has a reflector 12 provided with a concavely curved reflection surface 14 which in its apex region has an opening 13.

A light source 10 is inserted in the opening 16 and held in it. The reflection surface 14 of the reflector 10 is curved so that the light transmitted by it from the light source 10 is reflected as a converging light beam. This is shown in FIGS. 1–3 and represented by several light rays. The reflection surface 14 of the reflector 12 can be at least approximately ellipsoidal. However, it can also have another shape which is determined by the course of the light rays to be reflected.

A light-impermeable shield 20 is arranged in a beam path of the light reflected by the reflection surface 14 of the reflector 12. The shield 20 is arranged substantially under the optical axis 13 of the reflector 12 and extends with its upper edge 21 substantially up to the height of the optical axis 13. The upper edge 21 of the shield 20 is shaped and arranged so that the light reflected by the reflection surface of the reflector 12 and passing on the upper edge 21 contains a bright-dark limit with a predetermined shaped end position. The shield 20 is arranged for example substantially in the plane of the front edge of the reflector 12 or spaced from it in a light outlet direction 11.

A lens 22 is arranged in the beam path of the light passing on the shield 20 and is spaced from the shield 20 in the light outlet direction 11. The lens 22 is formed as a collecting lens, for example in form of a plane-convex lens. It has a plane side 23 which faces the reflector 12 and is opposite to the light outlet direction 11, and a convex side 24 which faces the light outlet direction 11. The convex side 24 of the lens 22 can be curved spherically or aspherically and can be subdivided into several partial regions of different curvature. The lens 20 has a circular edge 26, with which it is arranged in a receptacle 28 of the front edge of the support element 30 which faces in the light outlet direction 11.

The lens 22 is held over its edge 26 on the support element 30, for example by clamping or arresting elements which engage on it and can be formed of one piece with the support element 30 or separately. The support element 30 can extend for example from the lens 22 opposite to the light outlet direction 11 to the front edge of the reflector 12, and there can have a flange 32 mounted on the front edge of the reflector 12. The flange 32 can be mounted for example by one or several rivets 33 or screws or in a similar manner on the front edge of the reflector 12. The support element 30 can be formed as a tubus with a closed outer surface or can be provided on its periphery with one or several openings. The support element 30 can be composed of synthetic plastic, or of metal, in particular bent metal plate.

The shield 20 can be mounted together with a flange 32 of the support element 30 on the front edge of the reflector 12, for example with the same mounting elements with which also the flange 32 is mounted. The shield 20 can be formed for example of one piece with the support element 30. The reflector 12 forms, together with the light source 10 inserted in it as well as together with the shield 20, the support element 30 and the lens 22, a structural assembly formed as a headlight insert.

A light permeable cover member 34 formed for example as a disk is arranged after the lens 22 in the light outlet direction 11. It closes the light outlet opening of the headlight. The cover disk 34 can be composed of glass or synthetic plastic and is adjusted in its course to the course of the vehicle part which surrounds the headlight. The headlight insert which is formed for example as described above can be arranged in a housing 36, and the cover disk 34 is mounted on the housing 36, for example at its front edge. The cover disk 34 at its inner side which faces opposite to the light outlet direction 11 and at its outer side facing in the light outlet direction 11, is substantially smooth and therefore has substantially no optical action. The light which is reflected by reflector 12, passes on the shield 20 and passes through the lens 22 is thereby not deviated during passage through the cover disk 34.

The cover disk 34 however has a lower edge region 38 which, due to adjustment to the course of the cover disk 34 to the course of the surrounding vehicle part or from stylish reasons, provides an optical action. On a light beam 40 in FIG. 1 it can be seen that the light passing through the edge region 38 of the cover disk 34 is deviated upwardly. Thereby a blinding of the oppositely coming vehicle driver can be caused, which is not permissible. In order to avoid this, a screening device is provided in form of an additional shield 42. The additional shield is arranged and formed so that the light reflected by the reflector 12 and passing over the shield 20 is at least partially screened, which would pass through the edge region 38 of the cover disk 44.

In the first embodiment shown in FIGS. 1 and 2, the additional shield 42 is arranged between the lens 22 and the shield 20, near the lens 20 22. The additional shield 42 extends, starting from the lower edge of the lens 22, in the beam direction of the light passing on the shield 20. A distance over which the additional shield 42 extends in the beam direction and the course of the upper edge 43 of the additional shield 42 is dependent on what part of the beam path extending over the shield 20 and passing through the lens 22 must be screened.

The additional shield 42 can be formed completely or at least partially light-impermeable and mounted for example on a holding element 30. The additional shield 42 can be formed of one piece with the support element 30. For example a part of the lower outer surface of the support element 30 can be bent upwardly so that the bent part extends in the beam path and forms the additional shield 42. This provides the advantage that no additional mounting element for the additional shield 42 is required. The additional shield 42 can be arranged between the cover disk 34 and the lens 22. However, the additional shield 42 when viewed in the headlight is directly visible through the cover disk 44. The additional shield 42, in a simple manner without changing the remaining parts of the headlight, prevents a blinding of the light by the light deviated upwardly in the edge region 38 of the cover disk 34. The headlight insert can be produced without the additional shield 42 so that a simple adaptation to the application is possible. The cover disk 32 has no region through which the light is deviated upwardly in unpermissible manner.

FIG. 3 shows the headlight in accordance with a second embodiment of the present invention. The basic construction is substantially identical to the construction of the first embodiments. The same parts corresponds to the parts of the first embodiment are identified with the same reference numerals, and only the parts which are different are described in detail herein below. The screening device for at least partial screening of light which can pass through the lower region 38 of the cover disk 34 is formed here by at least partially light-impermeable coating 46 applied on the lens 22. The coating 46, as shown in FIG. 3, can be applied on the convex side 24 facing in the light outlet direction 11 or on the plane side 23 facing opposite to the light outlet direction 11. The coating 44 extends at least partially over the region of the lens 22, through which the light can pass, which subsequently pass through the edge region 38 of the cover disk 34.

The coating 46 can be completely light-impermeable or at least partially light-impermeable so that through it the light can pass only in a small part and during passage through the edge region 38 of the cover disk 34 no impermissible blinding can be caused any longer. The coating 46 can be partially reflective. Thereby, in particular, when it is applied on the convex side 24 of the lens 22 facing in the light outlet direction, which is visible when looked through the cover disk 34, the appearance of the headlight can be improved. The coating 46 can be composed of metal and applied for example by vapor deposition of the lens 22. Also, in the headlight in accordance with the second embodiment, in a simple manner by use of a lens 22 with the coating 44, an unpermissible blinding can be avoided. When the cover disk 34 has no region 38 through which the light can be deviated upwardly in unpermissible manner, then a lens 22 can be used without the coating 46.

It will be understood that each of the elements described above, or two or more together, may also find a useful application in other types of constructions differing from the types described above.

While the invention has been illustrated and described as embodied in headlight for vehicle in accordance with projection principle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A headlight for a vehicle operating in accordance with a projection principle, comprising a light source; a reflector; a shield arranged in a beam path of a light reflected by said reflector for producing a bright-dark limit of a light bundle exiting the headlight; a lens through which the light passing over said shield passes; a light-permeable cover member arranged after said lens in a light outlet direction, said cover member having a region which deviates the passing light upwardly such that a light passing over an upper edge of said shield and through said region of said cover member is deviated; and a screening device arranged between said shield and said cover member forwardly of said shield and formed so that at least a part of the light passing over said shield above said shield which would pass through said region of said cover member that deviates light upwardly and would be blinding to oppositely coming cars in a low beam use, is screened.

2. A headlight as defined in claim 1, wherein said screening device is formed as an additional shield arranged between said first mentioned shield and said cover member.

3. A headlight as defined in claim 2, wherein said additional shield is arranged between said first mentioned shield and said lens.

4. A headlight as defined in claim 2; and further comprising a support element connected with said reflector, said lens being held on said support element, said additional shield being also held on said support element.

5. A headlight as defined in claim 4, wherein said additional shield is formed of one piece with said support element.

6. A headlight as defined in claim 1, wherein said screening device is formed by a partial coating of said lens with at least partially light-permeable material.

7. A headlight as defined in claim 1, wherein said region of said cover member is arranged near a lower edge of said cover member.

* * * * *